June 17, 1958 C. M. DAVIS, JR 2,839,617

BIASING MEANS FOR SELF-SATURATING MAGNETIC AMPLIFIER

Filed April 20, 1954 3 Sheets-Sheet 1

INVENTOR
C. M. DAVIS, JR.

BY

ATTORNEYS

June 17, 1958 C. M. DAVIS, JR 2,839,617

BIASING MEANS FOR SELF-SATURATING MAGNETIC AMPLIFIER

Filed April 20, 1954 3 Sheets-Sheet 2

INVENTOR
C. M. DAVIS, JR.

BY

ATTORNEYS

June 17, 1958 C. M. DAVIS, JR 2,839,617

BIASING MEANS FOR SELF-SATURATING MAGNETIC AMPLIFIER

Filed April 20, 1954 3 Sheets-Sheet 3

INVENTOR
C. M. DAVIS, JR.

BY

ATTORNEYS

United States Patent Office 2,839,617 Patented June 17, 1958

2,839,617

BIASING MEANS FOR SELF-SATURATING MAGNETIC AMPLIFIER

Charles Mitchell Davis, Jr., Washington, D. C., assignor to the United States of America as represented by the Secretary of the Navy Application April 20, 1954, Serial No. 424,528

3 Claims. (Cl. 179—171)

(Granted under Title 35, U. S. Code (1952), sec. 266)

The invention described herein may be manufactured and used by or for the Government of the United States of America for governmental purposes without the payment of any royalties thereon or therefor.

This invention relates in general to magnetic amplifiers and in particular to a biasing circuit for a self-saturating amplifier.

In the prior art, magnetic amplifiers of the self-biasing type require or employ separate windings for the biasing current and a full-wave rectifying system for supplying said biasing circuit. Such an arrangement has the disadvantage that the additional winding requires substantial space thereby restricting the number of turns on the power windings for a device of a given size. The old devices of this type also have another disadvantage in that they require a complete full-wave rectifier to produce the biasing current which in turn requires additional structural elements.

The present invention makes it possible to construct a magnetic amplifier which, for given overall dimensions, will be more powerful than one of the older type with the separate winding. The invention consists in using a portion of the power winding in the biasing circuit.

It is one object of the present invention to provide a self biasing magnetic amplifier in which the number of turns on the winding for a given power rating is less than normally required.

Another object of the present invention is to increase a magnetic amplifier's power handling abilities without increasing the overall dimensions of the magnetic amplifier.

Other objects and many of the attendant advantages of the invention will be readily appreciated as the same becomes better understood by reference to the following detailed description when considered in connection with the accompanying drawings wherein.

Referring now to the drawings, wherein like parts are correspondingly numbered, the invention will be described in greater detail.

Figure 1:
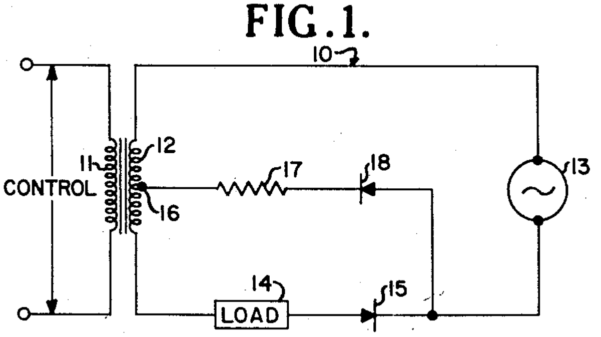
Fig. 1 is a diagram of single-ended self-saturating magnetic amplifier employing the invention.

In Fig. 1 there is shown a magnetic amplifier, generally designated at 10, having a control winding 11 and a power winding 12. The power for this magnetic amplifier is supplied from an alternating source 13. This particular form of the magnetic amplifier is of the half-wave single-ended self-saturating type. It, therefore, has the load 14 connected in series with the power winding 12 and a power rectifier 15. The power winding 12 is provided with a tap 16 which connects through a resistance 17 and a rectifier 18 to a point in the circuit between the power rectifier 15 and the source 13 and provides a biasing current for the magnetic amplifier. The value of the biasing current will be determined by the size of the resistor 17.

The circuit as shown in Fig. 1 employs a rectifier 18 in the biasing circuit. However, in many applications the use of this rectifier 18 is not essential to the operation of the invention. The use of the rectifier 18 serves merely to reduce the amount of current flowing through the bias windings during the power half cycle of the magnetic amplifier. The amount of this current flowing through the bias circuit on the power half cycle affects the efficiency of operation of the device inversely as the amount of current flowing increases. Since the amount of this current can be reduced to a small quantity by the use of the large resistance at 17, there are many circuits that perform satisfactorily for many purposes. It is only when a high degree of efficiency is desired that it is necessary to use the rectifier to reduce the amount of current flowing through resistor 17.

In operation, in magnetic amplifier, Fig. 1, current flows through the load winding and the load on one-half of the cycle and through the biasing resistance and a portion of the load winding 12 on the other half of the power cycle.

The current flowing through the biasing circuit resets the degree of saturation of the core for the succeeding power pulse which is delivered to the load 14 during the half cycle of the source current following the half cycle during which the biasing current flows.

By thus utilizing a portion of the power winding to accomplish the resetting of the core magnetization in the conventional manner, the space normally required for the reset winding may be utilized to increase the power handling ability of main windings or, if desired, it may be considered in the design to reduce the overall dimension of the amplifier.

Figure 2:
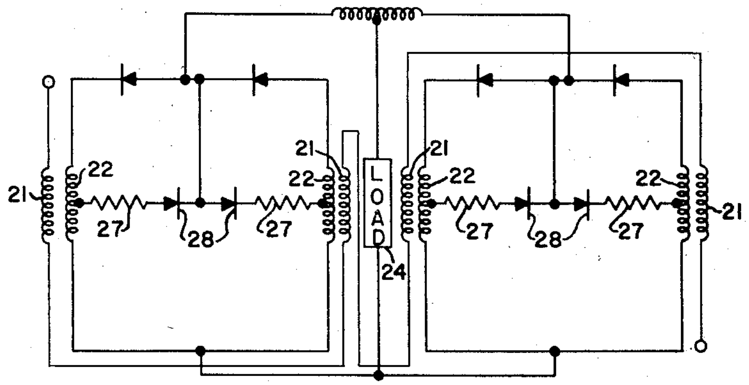
Fig. 2 is a diagram of a full-wave double-ended self-saturating magnetic amplifier employing the invention.

In Fig. 2 there is shown a full-wave double-ended magnetic amplifier in which power is supplied through a winding 23 which has a center tap. Since the general form of this type of magnetic amplifier is conventional, the description will be limited to the application of this invention to this type of magnetic amplifier. As can be seen from the drawings, each of the windings 22 has connected to a tap on its turns, a resistant 27 which in turn is connected in series to rectifier 28 for the power source at 23. The rectifiers 28 are so oriented in each of the sections of the full-wave double-ended magnetic amplifier that one of the windings in each section is reset during one-half of the cycle and that other winding in each section is reset during the other half of the cycle.

Figure 3:
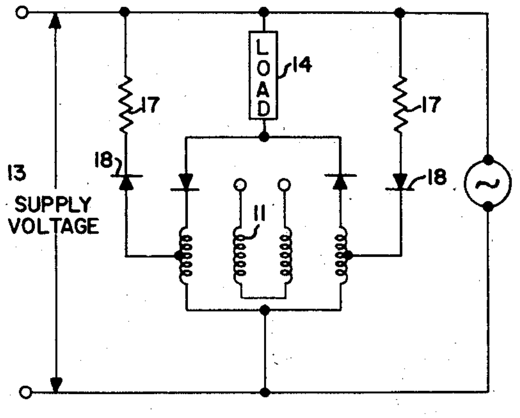
Fig. 3 is a diagram of a full-wave, single-ended self-saturating magnetic amplifier employing the invention.

Figs. 3 through 9 show additional ways in which the invention of this application may be applied to magnetic amplifiers and in Fig. 3 the invention is applied to a full-wave single-ended magnetic amplifier. In Fig. 3 the rectifiers 18 are so oriented that one core is being reset on the half cycle when the other core is firing and vice versa.

Figure 4:
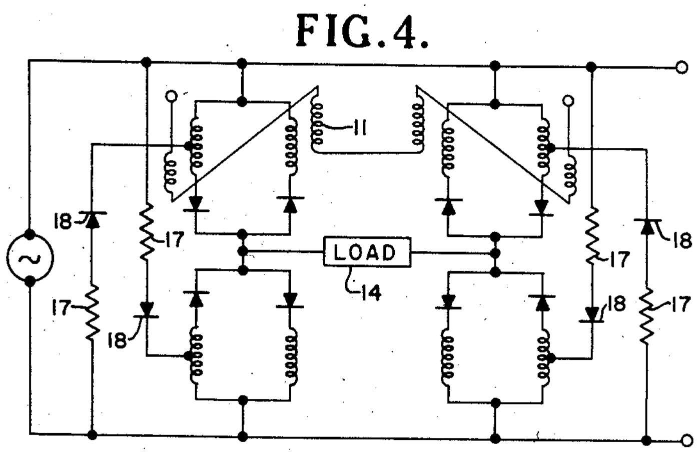
Fig. 4 is a diagram of a double bridge circuit magnetic amplifier with parallel resets employing the invention.
Figure 5:
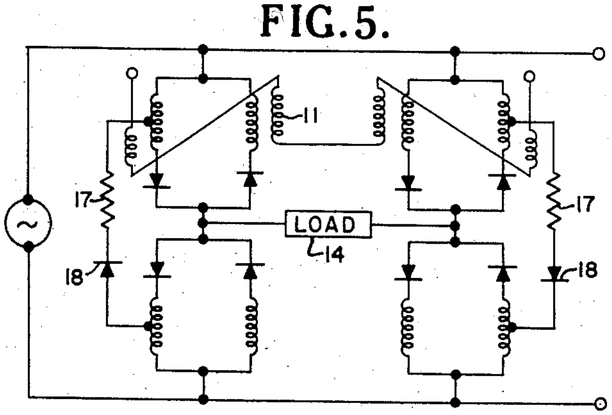
Fig. 5 is a diagram of a double bridge magnetic amplifier circuit with a series reset employing the invention.

In Fig. 4 the invention is applied to a bridge type circuit so that one bridge resets while the other fires and vice versa. In this figure the reset circuits are in parallel while in Fig. 5 a somewhat similar situation exists except that the reset circuit is in series.

Figure 6:
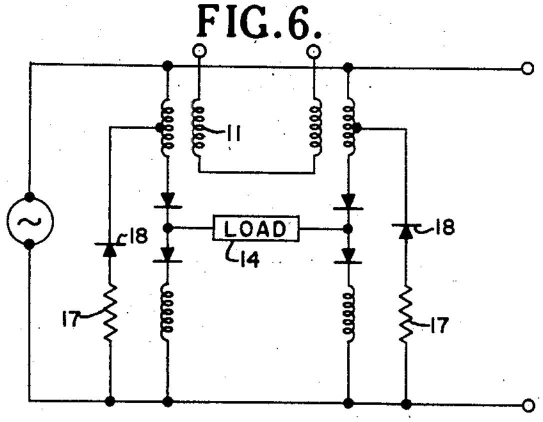
Fig. 6 is a diagram of a half-wave bridge magnetic amplifier with a parallel reset employing the invention.

In Fig. 6 there is shown a parallel reset circuit for a half-wave bridge magnetic amplifier. In this circuit both cores are reset on the same half cycle and the reset current through the winding on one core is independent of that through the winding on the other.

Figure 7:
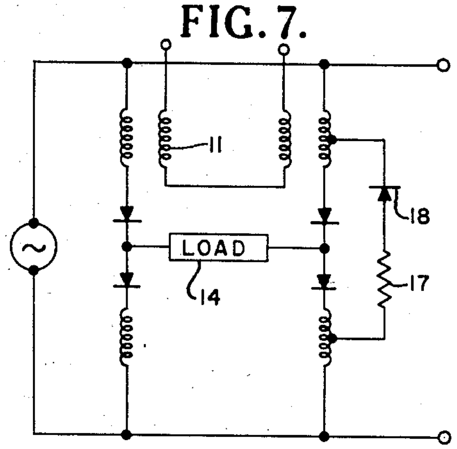
Fig. 7 is a diagram of a half-wave bridge magnetic amplifier with a series reset employing the invention.

In Fig. 7 the reset circuit is of a series type for a half-wave bridge magnetic amplifier and differs from the circuit in Fig. 6 in that the reset circuit is in series with the bridge sections and that the reset currents are not independent.

Figure 8:
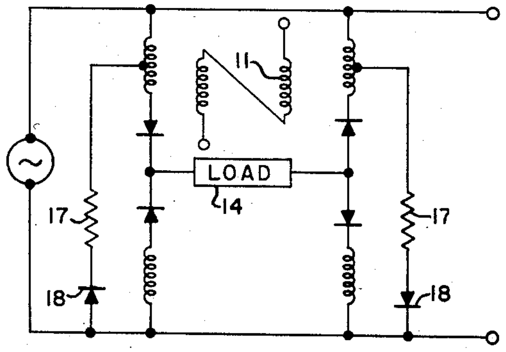
Fig. 8 is a diagram of a full-wave bridge magnetic amplifier with parallel resets employing the invention.

In Fig. 8 there is shown a parallel reset circuit for full-wave bridge type amplifier. Here as in previous parallel reset circuits the one core is reset while the other is fired and vice versa.

Figure 9:
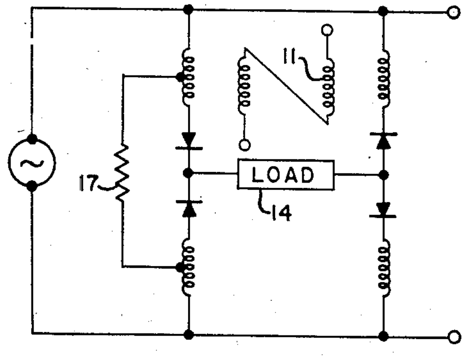
Fig. 9 is a diagram of a full-wave bridge self-centering magnetic amplifier circuit with series reset employing the invention.

In Fig. 9 there is shown a series reset circuit for a full-wave magnetic amplifier.

In all of the circuits shown the type of the control circuit applied to the magnetic amplifier is not part of the present invention and it is to be understood that many other types of control circuits could be applied. For example, control circuits such as shown in the application of Philip W. Barnhart, Serial No. 501,218 filed April 13, 1955, which matured into U. S. Patent 2,754,474 on July 10, 1956, could be employed.

It is to be understood that the above described circuits are merely illustrative of the present invention and obviously many modifications and variations of the present invention are possible in the light of the above teachings. It is therefore to be understood that within the scope of the appended claims the invention may be practiced otherwise than as described.

What is claimed as new and desired to be secured by Letters Patent of the United States is:

1. In a self-saturating magnetic amplifier half-wave section having saturable reactor core means with control winding means thereon energized from a control source and a load winding thereon serially interconnecting a load to an A. C. power source through a unidirectional conductive device which is phased to pass half-wave current of one polarity from said source in one direction through said load winding, a biasing circuit connected across the A. C. power source to pass therefrom half-wave current of a polarity opposite to said one polarity and comprising, in series circuit connection, a portion of said load winding, and impedance means of such character as to pass said opposite-polarity half-wave current through said load winding portion in a direction opposite to said one direction, whereby reference flux level is established in said half-wave section.

2. In a self-saturating magnetic amplifier half-wave section having saturable reactor core means with control winding means thereon energized from a control source and load winding means thereon with circuit means including a load to pass load current in one direction through said load winding means on alternate half-cycles of one polarity of an A. C. source which is connected to supply operating potential to said section: said biasing circuit being connected across the A. C. source and comprising, in series circuit relation, a portion of said load winding means, a current limiting resistor, and rectifier phased to pass through said load winding portion half-cycle current of a polarity opposite to said one polarity and in a direction opposite to said one direction.

3. In combination, a source of alternating current, a load, a magnetic amplifier half-wave section including saturable reactor core means with a load winding thereon, a rectifier serially connecting said load winding between said source and said load and phased to pass load current through said load on alternate half-cycles of one polarity from said source, biasing means connected for energization from said source and including a portion of said load winding in series circuit relation with a resistor and rectifier, said rectifier being phased to pass alternate half-cycles from said source of a polarity opposite to said one polarity, and control winding means on said core means for connection to a control source.

References Cited in the file of this patent

UNITED STATES PATENTS

| | | |
|---|---|---|
| 2,465,451 | Hedstrom et al. | Mar. 29, 1949 |
| 2,509,738 | Lord | May 30, 1950 |
| 2,518,953 | Sorenson | Aug. 15, 1950 |
| 2,552,952 | Gachet et al. | May 15, 1951 |
| 2,683,853 | Logan | July 13, 1954 |
| 2,754,473 | Hooper | July 10, 1956 |
| 2,780,770 | Lee | Feb. 5, 1957 |